(12) United States Patent
Muehlebach

(10) Patent No.: US 7,453,047 B2
(45) Date of Patent: Nov. 18, 2008

(54) CABLE DUCT

(75) Inventor: Moritz Muehlebach, Dietlikon (CH)

(73) Assignee: Proverum AG, Baar (CH)

( * ) Notice: Subject to any disclaimer, the term of this patent is extended or adjusted under 35 U.S.C. 154(b) by 56 days.

(21) Appl. No.: 11/557,297

(22) Filed: Nov. 7, 2006

(65) Prior Publication Data
US 2008/0128162 A1 Jun. 5, 2008

(51) Int. Cl.
*H02G 3/08* (2006.01)
(52) U.S. Cl. .................. 174/481; 174/480; 174/68.1; 174/487; 174/135; 52/220.7; 439/207
(58) Field of Classification Search ............ 174/480, 174/481, 482, 487, 70 C, 21 R, 24, 68.1, 174/68.3, 135, 72 A, 72 C, 96, 97; 439/207, 439/451; 248/68.1, 74.3; 52/220.7, 220.1–220.5
See application file for complete search history.

(56) References Cited

U.S. PATENT DOCUMENTS

| 5,602,364 | A * | 2/1997 | Ustin ....................... 174/68.3 |
| 6,362,420 | B1 * | 3/2002 | Bacouelle et al. ............ 174/504 |
| 6,450,458 | B1 * | 9/2002 | Bernard ..................... 248/68.1 |
| 6,693,238 | B2 * | 2/2004 | Jadaud et al. ............... 174/480 |

FOREIGN PATENT DOCUMENTS

| AT | 006495 U1 | 11/2003 |
| DE | 1886314 U | 1/1964 |
| DE | 2408095 A1 | 8/1975 |
| DE | 2415768 A1 | 10/1975 |
| DE | 29814309 U1 | 6/1999 |
| DE | 19917913 A1 | 5/2001 |
| EP | 0803619 A1 | 10/1997 |
| EP | 1217277 A1 | 6/2002 |
| GB | 919515 | 2/1963 |
| GB | 1465578 | 11/2006 |
| WO | 2004 020755 A2 | 3/2004 |

OTHER PUBLICATIONS

European Search Report.

* cited by examiner

*Primary Examiner*—Dhiru R Patel
(74) *Attorney, Agent, or Firm*—David S. Safran

(57) ABSTRACT

A cable duct (1) is provided for wall mounting a cable. The duct includes a cable acceptance region (2) and a lower terminating section (3) for arrangement on the floor and for covering the edges of floor coverings. The cable acceptance region (2) has a cable acceptance housing (4) attached to the wall in the mounted state, and a removable cover (5). The removal of the cover provides access to the interior (6) of the cable acceptance housing (4). The lower terminating section (3) is permanently connected to the cable acceptance housing (4) so that the lower terminating section (3), even with the cover (5) removed in the mounted state of the cable duct, (1) remains in a fixed arrangement to the floor. To facilitate the mounting of the cable duct, a clip (27) is provided for wall mounting. The clip (27) on its upper end has a section (30) bent away from the wall that is received in a corresponding leg receiver (31) located on the back of the cable acceptance housing (4).

12 Claims, 3 Drawing Sheets

CABLE DUCT

BACKGROUND OF THE INVENTION

1. Field of the Invention

The invention relates to a cable duct for wall mounting, with a cable acceptance region and a lower terminating section for arrangement on the floor for covering the edges of floor coverings.

2. Description of Related Art

A cable duct for wall mounting is disclosed in DE U 1 886 314. In this device, a screw connection is used to mount the cable duct. Unfortunately, it is possible for the cable duct to be scratched in the process of fastening the screw, thereby marring the appearance of the duct. It is moreover disadvantageous that the screw connection is visible from the outside. Additionally, unscrewing the screw connection to dismount the cable duct is difficult.

SUMMARY OF THE INVENTION

The object of this invention is therefore to make available a cable duct which can be easily mounted and dismounted with respect to a wall without the aforementioned disadvantages associated with the prior art.

To achieve this object, the cable duct of the invention includes a cable acceptance region having a cable acceptance housing attached to the wall in the mounted state, and a removable cover. The removal of the cover provides access to the interior of the cable acceptance housing, and the lower terminating section is permanently connected to the cable acceptance housing, so that the lower terminating section remains in a fixed arrangement with respect to the floor even when the cover is removed in the mounted state.

The cable duct has at least one clip for wall mounting, the clip having on its upper end a section bent away from the wall. The back of the cable acceptance housing includes a corresponding upper leg receiver for the bent section of the clip. The use of a clip of the aforementioned type has various advantages. For example, the clip can be mounted independently of the cable channel. The clip can either be cemented or screwed to the wall. If for example the clip is scratched by a screwdriver, this will not mar the appearance of the duct since the cable duct covers the clip when it is placed over the clip and is mounted or held on it. As a result of the connection via the clip, the cable duct can otherwise not only be easily mounted, but also dismounted in order to improve the accessibility of the cable acceptance housing and to facilitate the insertion of cables. After the cables have been inserted, the cable channel can be suspended over the top bent section of the clip and the leg receiver on the wall.

In order to achieve good and secure holding of the cable duct, it is otherwise provided that the clip has an essentially L shape, with a vertical leg and a horizontal leg. The horizontal leg of the clip is inserted within an essentially horizontal, open leg receiver provided underneath the cable acceptance housing. The clip on the horizontal leg has a spring projection, and in the receiver a corresponding catch projection is provided. Ultimately, this yields a reliable, but also easily releasable connection of the cable duct to the wall via a corresponding catch connection between the clip and the cable acceptance housing.

In order to facilitate screw-fastening the clip onto the wall parallel to the surface of the floor covering, there is at least one oblong hole on the clip so that the clip can be aligned correspondingly parallel to the floor surface.

In certain applications it is difficult or even impossible to attach the clip to the wall. In order to then be able to mount the cable duct in some other way, a leg is provided above the horizontal leg receiver which projects backwards. Between the leg and the upper leg receiver for the leg clip a cement acceptance region is formed. On this cement acceptance region which is formed by the horizontal leg receiver and the aforementioned leg and which has a height only between 1 to 10 mm, preferably 1 to 5 mm, cement can be applied so that the cable channel can also be easily cemented to the wall.

Of course it is also fundamentally possible to screw the cable duct of the invention to the wall. To accommodate such screw fastening, the front wall of the cable acceptance housing has thickened segments so that after drilling through this wall the use of countersunk head screws is easily possible. It is also possible on the front side wall of the housing to provide corresponding screw holes which are then covered via corresponding coverings.

In order to simplify initial mounting of the cable duct in accordance with the invention and to achieve a clean, flush termination, the lower terminating section has a sealing lip for engagement with the floor. To attach the sealing lip, there is a lengthwise running groove in the lower terminating section for receiving a retaining section of the sealing lip. The groove is made such that the retaining section can be inserted transversely to the lengthwise direction of the groove and thus from underneath and ultimately need not be pushed in the lengthwise direction of the groove.

In the construction in accordance with the invention, it is preferable that the area behind the terminating section is separated from the interior by at least one wall to the top. The space between the top and the lower terminating section provides another cable acceptance region in which cables can be placed.

In order to achieve a clean transition between the two cable duct sections which run at an angle on the corner regions, there is at least one corner piece. The corner piece has a corner body which is arranged vertically in the mounted state and which has two front covers which are at an angle to one another, and an angled top cover plate which is matched to the angle of the pertinent wall. Altogether the corner piece is made such that in the mounted state the front covers overlap the edges of the forward side walls of the bordering cable acceptance housings, while the upper cover plate on the top overlaps the adjacent cable acceptance housings. Thus, the edges of the adjoining, angularly arranged cable duct regions, which edges are mitred, are overlapped by the corner piece so that rough cut edges are not visible.

In order to obtain secure holding of the corner piece on the cable duct which is conventionally mounted on the wall, on the corner piece there is at least one leg for engaging the cable duct and holding the corner piece on the cable duct.

With respect to the fact that the corner piece overlaps the adjacent cable duct section both on the front and also the top, at the connecting site between the upper cover plate and the corner body there is a predetermined breaking point. The predetermined breaking point makes it possible to remove the cover of the cable duct over which the upper cover plate extends on the end side without requiring complete dismounting of the corner piece. When a force is applied to remove the cover, the upper cover plate breaks off at the predetermined breaking point so that the cover can then be removed.

So that the corner piece can still be used after breaking off the upper cover plate from the corner body, on one end of the cover plate underneath there is a slot for holding the end of a cover, while the other end is made without a slot. The slot is made through the bottom of the cover plate and a separate leg which is provided on the bottom of the cover plate.

It goes without saying that it is also alternatively possible to form the corner piece beforehand from several parts, and in this connection to provide a separate corner body and a separate cover plate.

Other features and advantages of this invention will become apparent from the following description of one embodiment using the drawings.

DETAILED DESCRIPTION OF THE INVENTION

Figure 1:
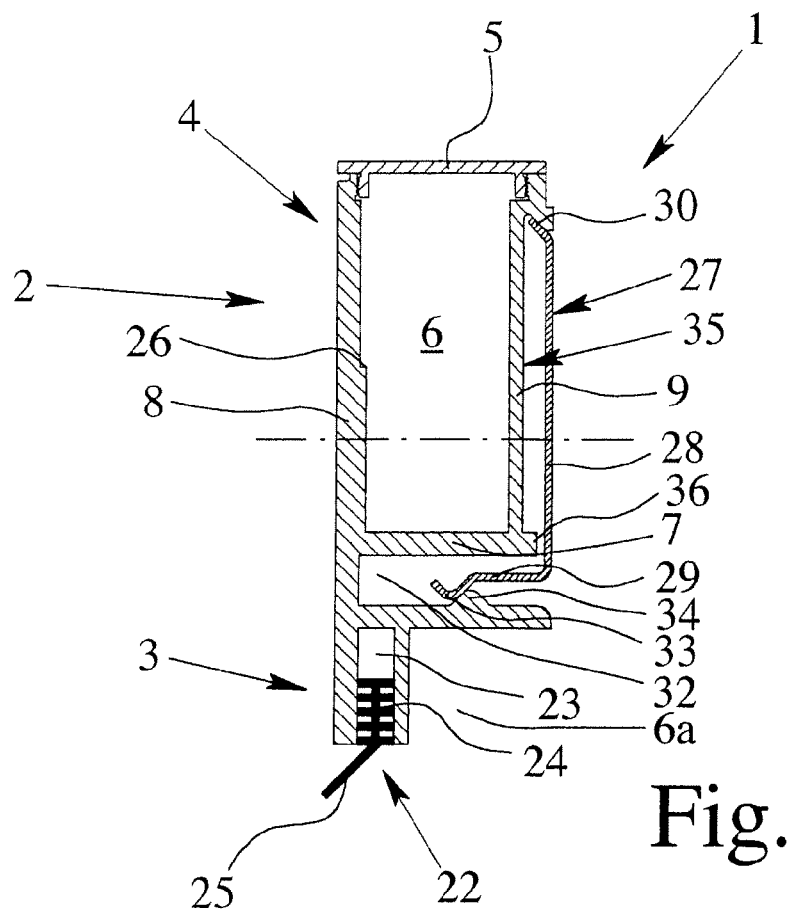
FIG. 1 shows a cross sectional view of a cable duct in accordance with the invention.
Figure 2:
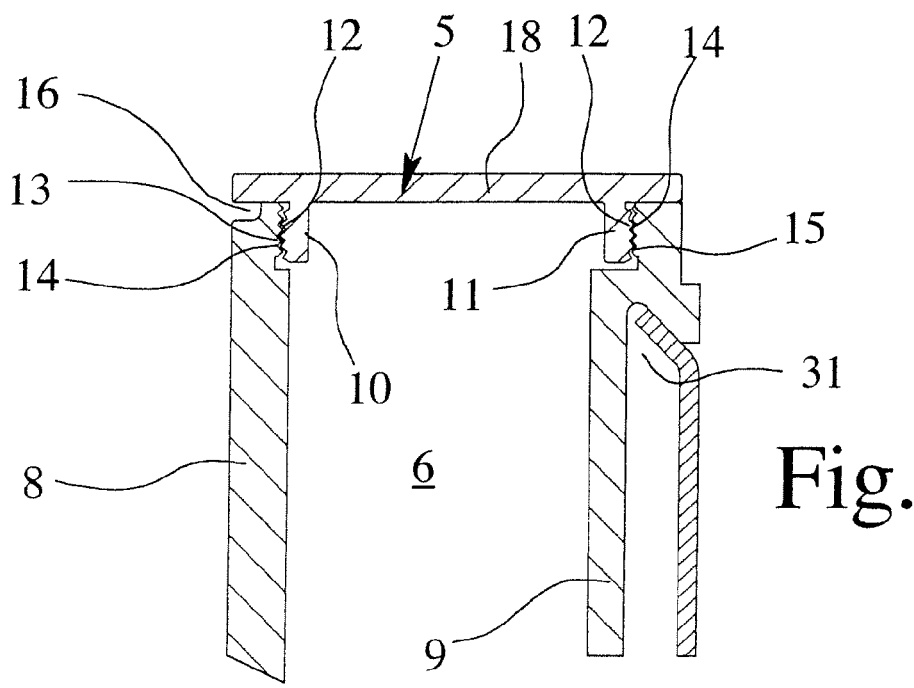
FIG. 2 shows an enlarged detail of the cable duct from FIG. 1.

FIGS. 1 and 2 show a cable duct 1 for wall mounting. The cable duct 1 has a cable acceptance region 2 and a lower terminating section 3. The terminating section 3 is intended to be placed and rested on the floor and to cover the edges of floor coverings which are not shown.

The cable acceptance region 2 has a cable acceptance housing 4 attached to the wall in the mounted state and a removable cover 5, there being access to the interior 6 of the cable acceptance housing 4 when the cover 5 is removed. The lower terminating section 3 is securely connected to the cable acceptance housing 4 with the result that the lower terminating section 3 even with the cover 5 removed in the mounted state of the cable duct 1 remains in a fixed arrangement to the floor. The arrangement or assignment of the terminating section 3 with respect to the floor is thus independent of whether the cover 5 is in place or not.

FIG. 1 shows that the cable acceptance housing 4 is made U-shaped in cross section and has a bottom 7, a front side wall 8 and a rear side wall 9. The two side walls 8, 9 each have the same height and thus determine the height of the interior 6 of the cable acceptance housing 4. The cover 5 is provided on the top of the cable acceptance housing 4. The cover 5 forms the upper termination and thus the removable top wall of the cable acceptance housing 4. But it would also be possible for the cover 5 to be located not only on the top, but also to encompass part of the front side all 4 or for the cable acceptance housing 4 to have a fixed upper wall and for there to be a cover only in the area of the front side wall 4.

The entire volume of the interior 6 is available to arrange and hold cables. Fasteners such as for example clips or the like, or individual bays for arranging and mounting individual cables, are not necessarily provided.

There is a catch connection to connect the removable cover 5 to the cable acceptance housing 4. For this purpose, the cover 5 on opposing lengthwise sides 2 has legs 10, 11 which project into the interior 6 of the cable acceptance housing 4 with catch projections 12. The two legs 10, 11 run parallel to one another in the lengthwise direction of the cable duct 1. On the cable acceptance housing 4 on opposing sides there are catch areas 13, 14 with corresponding catch projection 15 which run lengthwise. There are a host of catch projections 12, 15 on each leg 10, 11 and on each catch area 13, 14. The catch projections are arranged in a sawtooth manner, the legs 10, 11 which have the catch projections 12 being made rounded or crowned in the region of the catch projections 12.

As is apparent from FIGS. 1 and 2, on the front side between the cable acceptance housing 4 and the cover 5 there is a gap 16 which enables engagement of a tool in order to easily remove the cover 5.

Figures 3, 4:
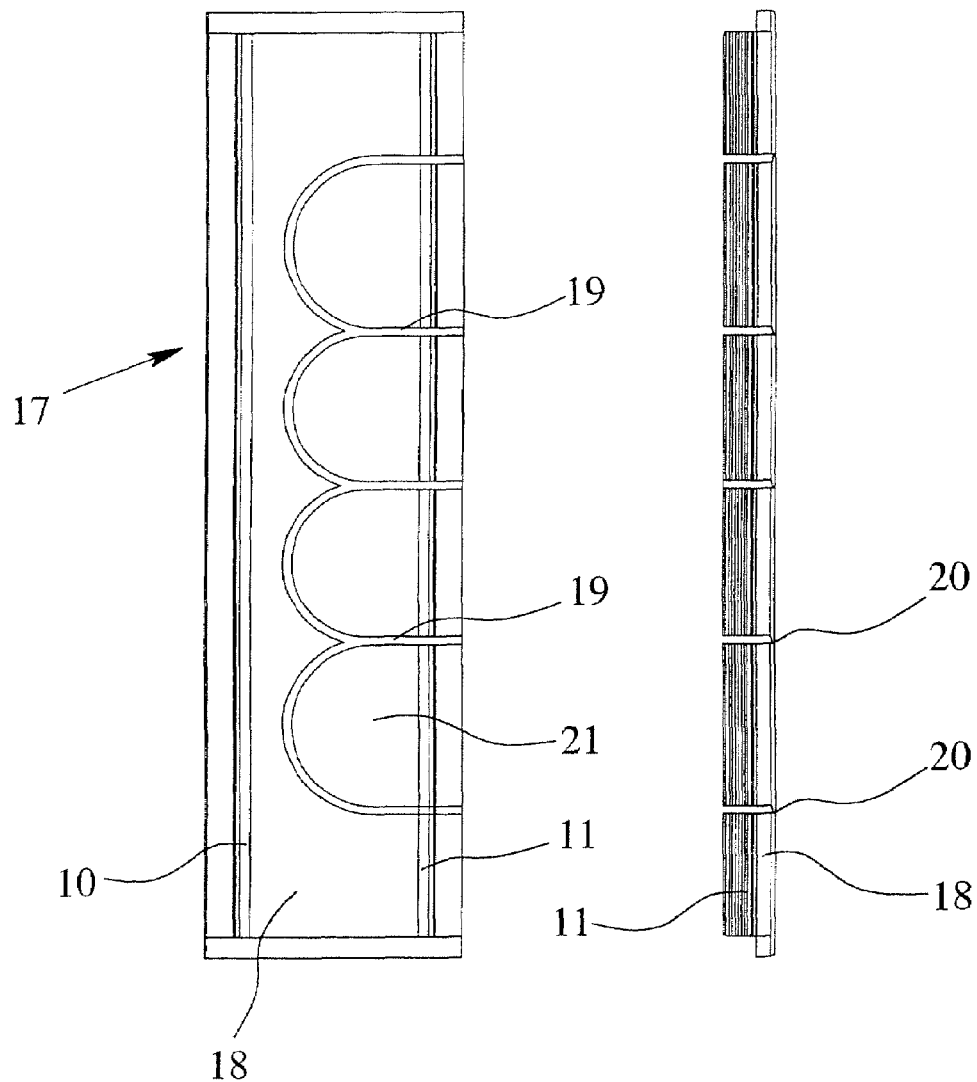
FIG. 3 shows a bottom view of a cable outlet piece for a cable duct in accordance with the invention.
FIG. 4 shows a side view of the cable outlet piece from FIG. 3.

In FIGS. 3 and 4 there is a cable outlet piece 17. The cable outlet piece 17 has the same basic structure as the cover 5, specifically a top plate 18 and the two longitudinally running legs 10, 11 with catch projections 12. Altogether the plate 18 has a closed top. On the bottom there are a host of arc-shaped grooves on the plate 18, the grooves 19 leading to thin material 20 in the plate 18. The grooves 19 and the thin material 20 yield given cable openings. The cable openings are formed by breaking out the plate segments 21 bordered by the grooves 19. In this embodiment the sections 21 extend beyond the legs 11. The grooves 19 are therefore routed out laterally; to facilitate manually breaking out the segment 21.

On the lower terminating section 3 there is a sealing lip 22. The lower terminating section 3 has a lengthwise running groove 23 into which a retaining section 24 of the sealing lip 22 is inserted. From the sealing lip 22 only the outer sealing tongue 25 projects out of the groove 23.

On the front side wall 8 the cable acceptance housing 4 is thickened in areas, specifically in the lower area, in order to be able to use a countersunk head screw after drilling through. In FIG. 1 this is shown by an inside step 26 in the interior 6. Of course there can also be holes, especially for countersunk head screws which are first covered via covers.

Otherwise, at least one clip 27 for wall mounting is assigned to the cable channel 1. The clip 27 which is made as a spring element has an L-shape with a vertically running leg 28 and a horizontally running leg 29. It is not shown that on the vertically running leg 28 there are a host of oblong holes to enable the clip 27 to be screwed to the wall and its at least essentially parallel alignment to the floor. On its top end the vertical leg 28 has a section 30 which is bent away from the wall, while on the back on the cable acceptance housing 4 there is a corresponding leg receiver 31 into which the section 30 can be inserted. Underneath the cable acceptance housing 4 there is an essentially horizontally aligned receiver 32 open on the back for the horizontal leg 29 of the clip 27. On the horizontal leg 29 there is a spring projection 33 which interacts with a corresponding catch projection 34 in the receiver 32.

Above the receiver 32 there is a cement acceptance region 35 which is ultimately formed by the outside of the rear side wall 9. The cement acceptance region 35 is bounded between the leg receiver 31 and the leg 36 which is provided above the receiver 32.

This version makes it possible to screw the cable duct to the wall, to lock it using clips 27 or to cement it to the wall by way of the cement applied to the cement acceptance region 35.

Underneath the receiver 32 and behind the lower terminating section 3 is another cable acceptance space 6a which is separated from the interior 6 and which is likewise designed to hold cables. The other cable acceptance space 6a is ultimately accessible from the outside via the sealing lip 22. The further cable acceptance space 6a is bounded to the bottom by the foundation, while to the rear is open or bordered by the wall.

Figure 5:
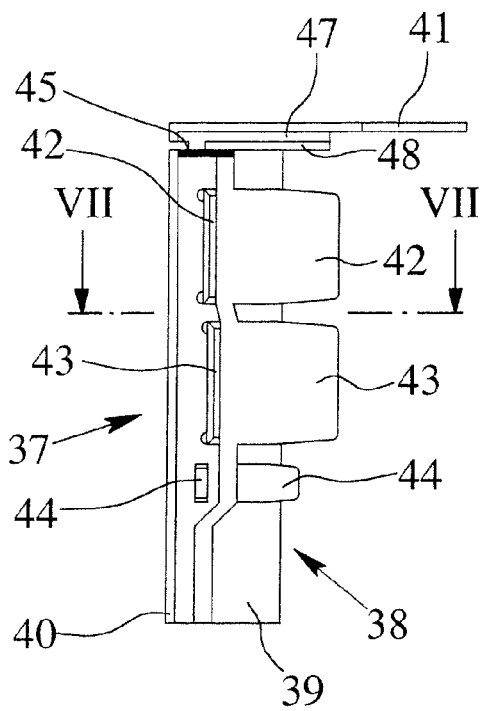
FIG. 5 shows a side view of a corner piece.
Figure 6:
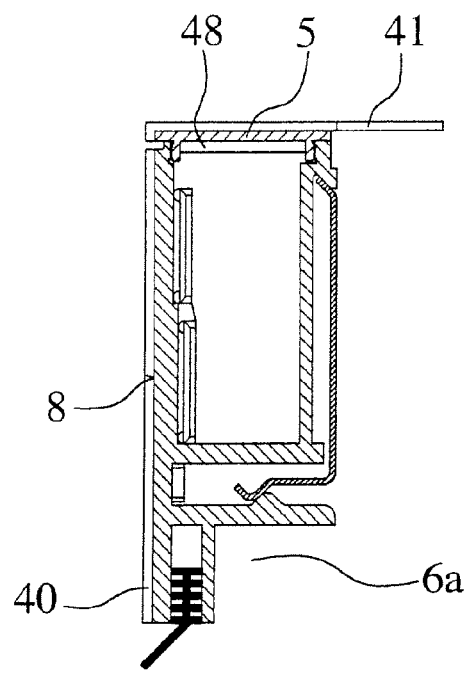
FIG. 6 shows a sectional view of a cable duct with the corner piece inserted.
Figure 7:
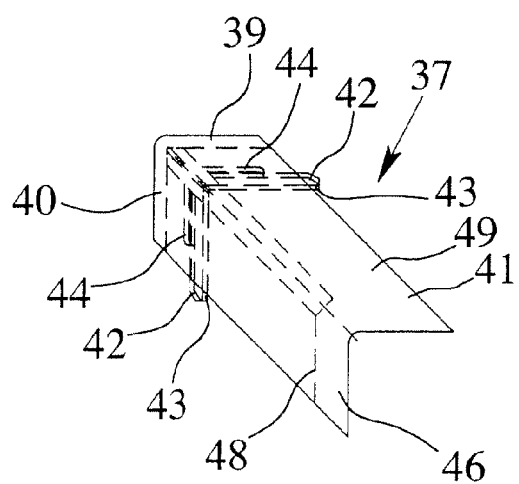
FIG. 7 shows a sectional view along the cutting line VII-VII from FIG. 5.

In FIGS. 5 to 7 there is a corner piece 37 for the cable duct 1. The corner piece 37 has a corner body 38 which is vertical in the mounted state and on which there are two front covers 39, 40 which are located at a right angle to one another. Furthermore, the corner piece 37 has an upper angular cover plate 41. The cover plate 41 is shown by the dotted line in FIG. 7. The cover plate 41 has an angle shape to the front and back which corresponds to the angle of the covers 39, 40 to one another.

As follows from FIG. 6, the covers 39, 40 on the front or end side in the region of the cut edge extend over or overlap the front side wall 8 so that a clean termination results and the miter cut on the cable duct section is not visible. In the same way, the upper cover plate 41 overlaps the respective cover 5 in the area of the miter cut. The upper cover plate 41 therefore on the end side rests on the respective cover 5.

To attach the corner piece 37 to the cable duct 1, on the end piece 37 there are a host of legs 42, 43, 44, between which and the corresponding cover 39, 40 one gap at a time is formed for the front side wall. The legs 42, 43 are located in the interior 6 of the cable acceptance housing 4, while the leg 44 is located in the receiver 32.

The corner body 38 is connected via a predetermined breaking point 45 to the upper cover plate 41. The predetermined breaking point 45 is designed such that when a force acts from bottom to top, i.e. when the cover 5 is lifted, the upper cover plate 41 breaks off the corner body 38.

Underneath the cover plate 41 in the region of one cover area 46 of the cover plate 41 there is a slot 47. The cover 5 can be inserted into the slot 47. The slot 47 is formed on the one hand by the cover plate 41 itself and by the lower leg 48. The leg 48 is shown by the dotted line in FIG. 7. On the other cover region 49 of the cover plate 41 there is conversely no slot and accordingly no leg 48. By the aforementioned construction it is even possible with the cover plate 41 broken off to keep the cover plate 41 still securely in its cover position, specifically via the arrangement of the cover 5 in the slot 47.

It is not shown that the corner piece may be formed from several parts. In particular, the corner piece can be made in two parts and in this connection has at least one corner body and one cover plate. The cover plate is then attached loosely or securely to the corner piece for covering purposes.

The insertion of a cable into the cable duct 1 is very simple. To do this, the cable duct 1 is first opened. Then a tool is inserted into the gap 16 and the cover 5 is levered up. Then a cable can be inserted from the top into the interior 6 of the cable acceptance housing 4. Then the cover 5 is locked again. The cable acceptance housing 4 and thus also the terminating section 3 remain stationary during this operation.

What is claimed is:

1. A cable duct mountable on a wall, comprising:
   a cable acceptance region;
   a lower terminating section arrangeable with respect to a floor for covering edges of floor coverings, and
   a clip mountable on a wall, the clip having a vertical leg with an upper end and a horizontal leg, the upper end including a bent section that is bent away from the wall when mounted
   wherein the cable acceptance region has a cable acceptance housing attachable to the wall, a removable cover that provides access to the interior of the cable acceptance housing, and a receiver for receiving the horizonatal leg of the clip.

2. Cable duct as claimed in claim 1, wherein the lower terminating section is permanently connected to the cable acceptance housing such that the lower terminating section remains in a fixed arrangement to the floor even when the cover is removed in a mounted state.

3. Cable duct as claimed in claim 1, wherein the vertical and horizontal legs of the clip essentially form an L shape and wherein underneath the cable acceptance region the receiver is essentially horizontally aligned and open on the back for receiving the horizontal leg of the clip.

4. Cable duct as claimed in claim 3, wherein, above the receiver, there is a housing leg which projects backwards and wherein between the housing leg and an upper receiver for the vertical leg, a cement acceptance region with a depth between 1 to 10 mm is formed.

5. Cable duct as claimed in claim 1, wherein the clip on the horizontal leg has a catch projection, and the receiver has a corresponding catch projection.

6. Cable duct as claimed in claim 1, wherein a front side wall of the cable acceptance housing at least one thickened section.

7. Cable duct as claimed in claim 1, wherein the lower terminating section has a sealing lip and wherein the lower terminating section has a lengthwise running groove for receiving a retaining section of the sealing lip.

8. Cable duct as claimed in claim 7, wherein a region behind the terminating section is separated from the interior and wherein this region has a further cable acceptance space.

9. Cable duct as claimed in claim 1, wherein there is at least one multi-part corner piece for connection of cable duct sections arranged at an angle to one another.

10. Cable duct as claimed in claim 9, wherein the corner piece has a corner body which is arranged vertically in the mounted state with two front covers which are arranged at an angle to one another and an angled top cover plate and wherein, in the mounted state, on the end, the front covers overlap forward edges of the adjacent cable duct sections, while the upper cover plate, on the tops, overlaps the adjacent cable duct sections.

11. Cable duct as claimed in claim 10, wherein on the corner piece there is at least one leg for engaging the cable duct section and for holding the corner piece on the cable duct section.

12. Cable duct as claimed in claim 10, wherein the cover plate and the corner body are connected to one another via a predetermined breaking point and wherein, on one cover region of the cover plate, on the bottom, there is a slot formed by the bottom of the cover plate and a lower leg for holding the end of the cover, while the other cover region is made without a slot.

* * * * *